March 7, 1961 M. ORLANDO 2,973,698
BATTERY LINING MECHANISM
Filed Nov. 29, 1957 5 Sheets-Sheet 1
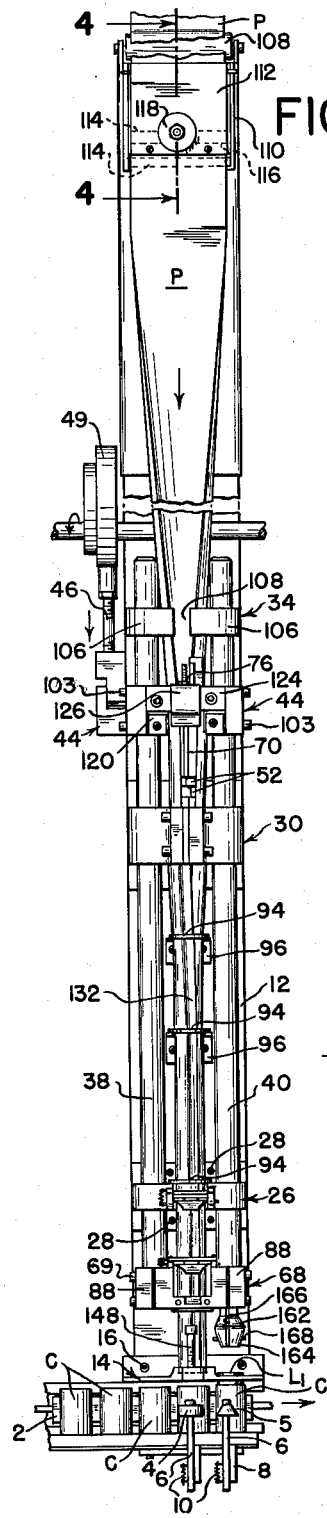
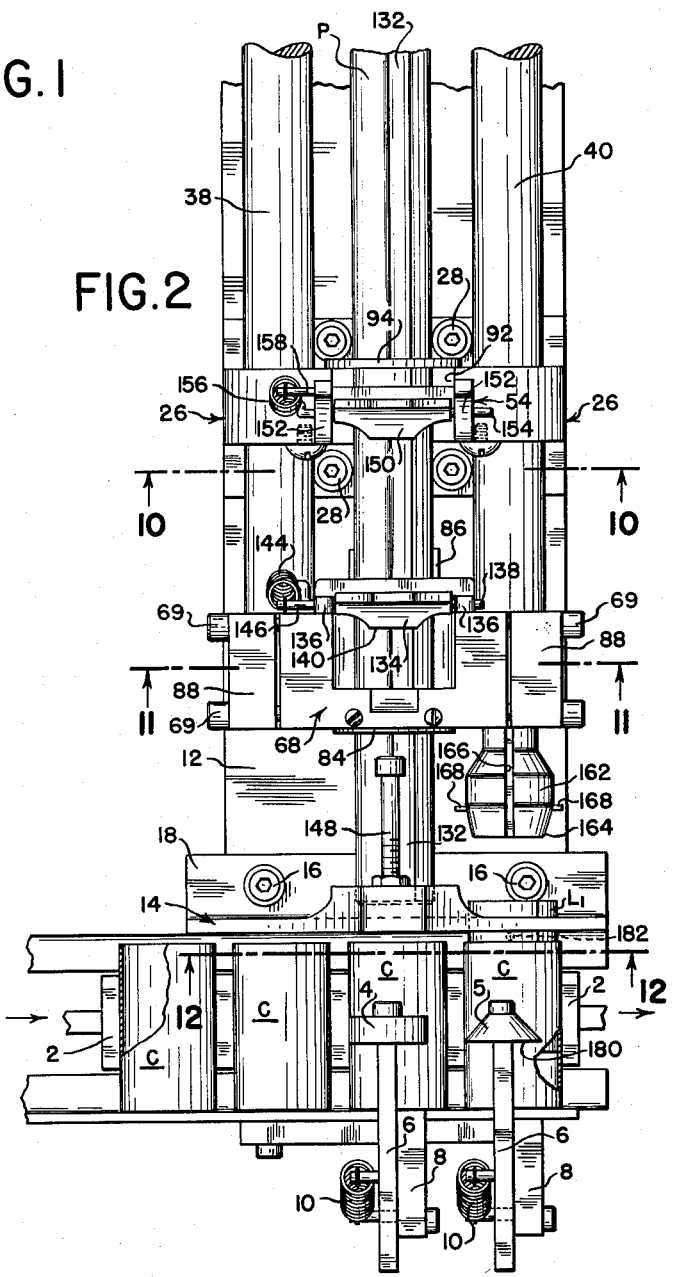
INVENTOR.
Matthew Orlando
BY
ATTORNEYS March 7, 1961 M. ORLANDO 2,973,698
BATTERY LINING MECHANISM
Filed Nov. 29, 1957 5 Sheets-Sheet 2

*INVENTOR.*
BY Matthew Orlando
*ATTORNEYS*

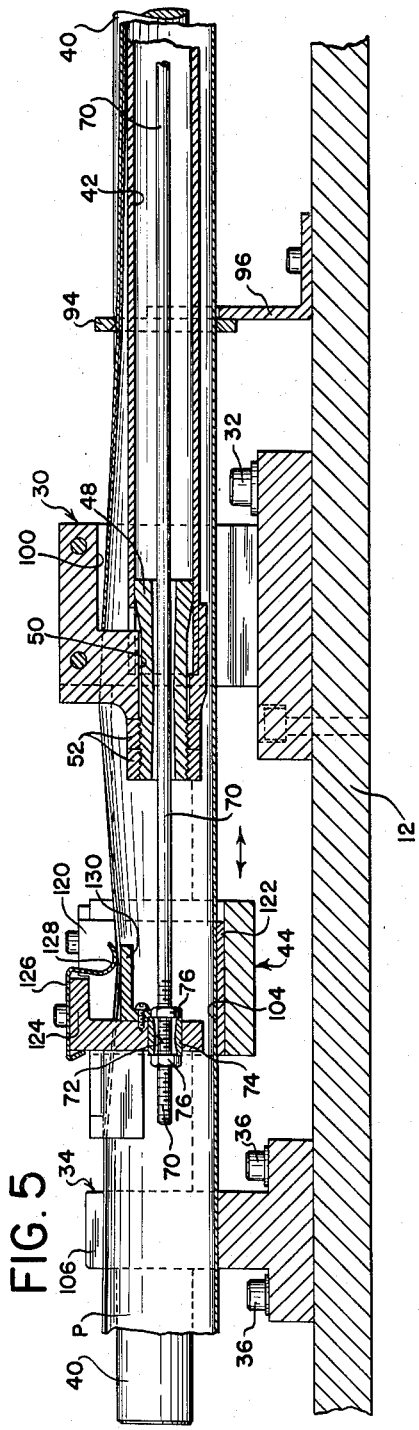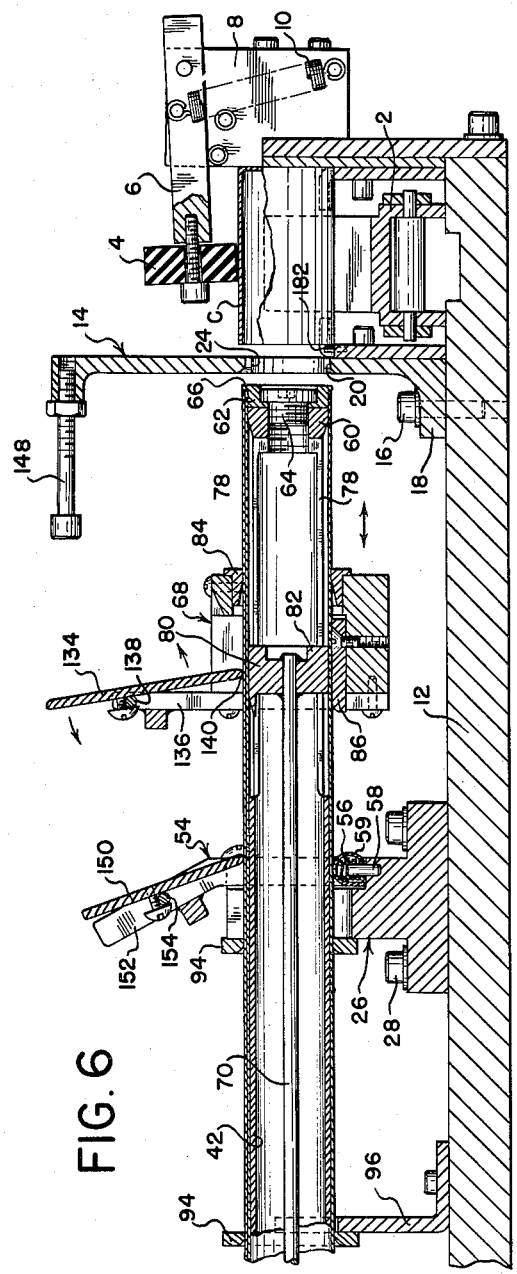

March 7, 1961
M. ORLANDO
2,973,698
BATTERY LINING MECHANISM
Filed Nov. 29, 1957
5 Sheets-Sheet 4
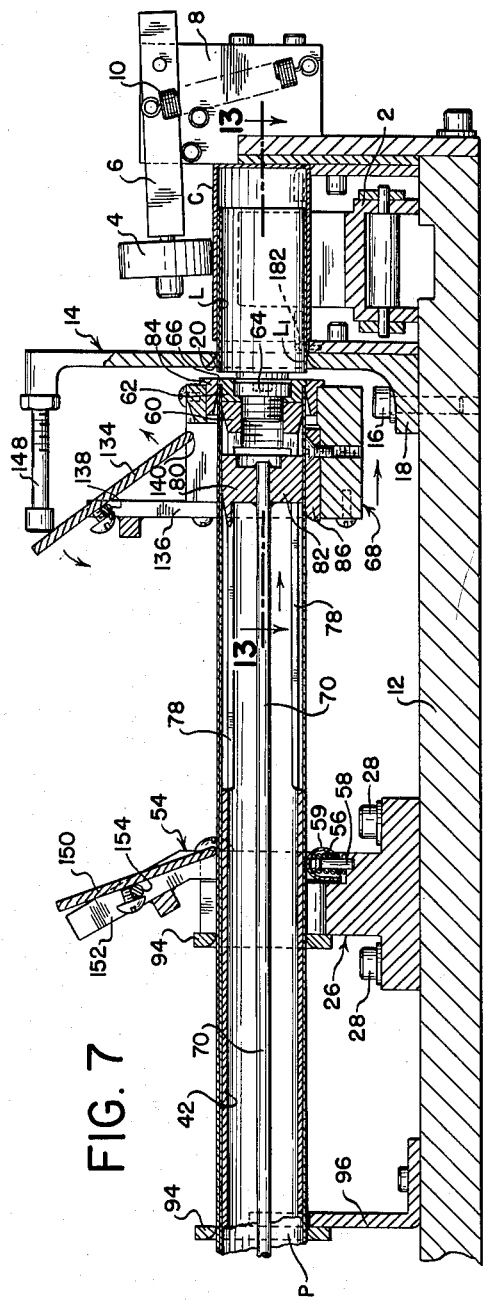
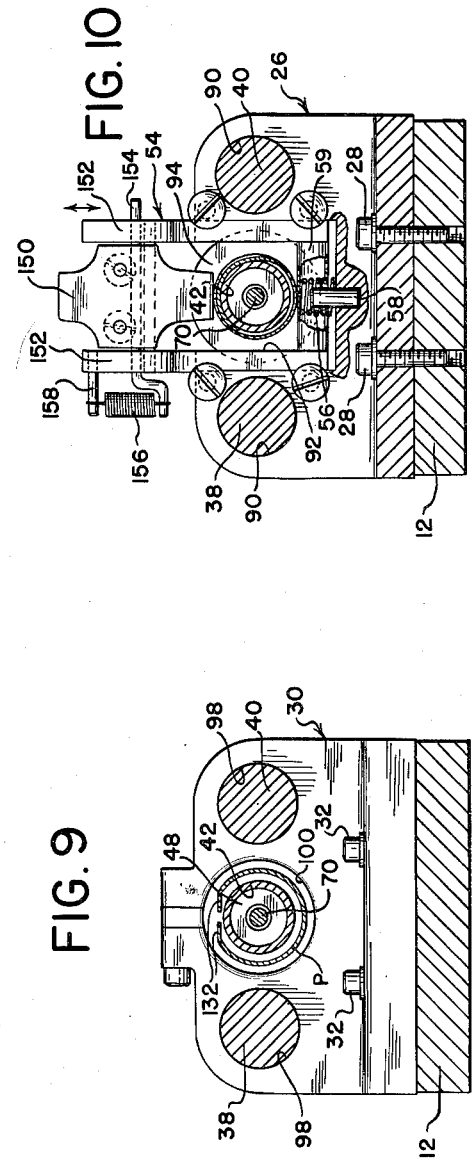
INVENTOR.
BY Matthew Orlando
ATTORNEYS March 7, 1961  M. ORLANDO  2,973,698
BATTERY LINING MECHANISM
Filed Nov. 29, 1957  5 Sheets-Sheet 5

INVENTOR.
Matthew Orlando
BY
ATTORNEYS

United States Patent Office 2,973,698
Patented Mar. 7, 1961

2,973,698

BATTERY LINING MECHANISM

Matthew Orlando, 573 Pearl St., Oceanside, N.Y., assignor to Matthew Orlando, Oceanside, and Leonard Schub, Portchester, N.Y.

Filed Nov. 29, 1957, Ser. No. 699,564

18 Claims. (Cl. 93—36.01)

This invention relates to the formation of paper cylinders from flat sheets of paper and the insertion of such cylinders into cans, and more particularly to the formation and insertion of liners in cylindrical cans of dry cells.

While the present invention is capable of use in any instance in which a flat sheet of flexible material is formed into a cylinder, or formed into a cylinder and inserted in a cylindrical member, such as a can or tube, the following description is directed to the formation of dry cell liners and their insertion into the zinc cans which form the container, and one electrode, of the conventional dry cell. The invention, however, is not limited to this specific use, and the reference to paper liners throughout the following description is, also, merely illustrative as the invention may be employed to convert other flexible sheet material into cylinders.

In a copending application of Leonard Schub and the applicant, Serial No. 540,463, filed October 14, 1955, Machine for Making Dry Cells, and assigned to the assignee of the present application there is disclosed and claimed mechanism for forming a paper liner and inserting it into a can, in which paper sheet of a width slightly greater than the circumference of the can is passed through a former, and arranged on a moving cylinder,. The paper is clamped on the cylinder by suitable means and moved forwardly with the cylinder. The frame on which the cylinder is mounted carries one element of a cutting die. The other element of the die is mounted on a rod which passes through the cylinder. When the paper has been fed a suitable distance into the cup, the forward portion of a suitable length is severed from the cylinder, and then moved further into the can.

In the present invention I provide improved means for forming flexible sheet material, such as paper, into a tube, and inserting it into a can or container. I have eliminated the conical-forming member of the co-pending application and have otherwise revised the arrangement of parts to produce a simpler and more efficient apparatus.

The construction and operation of the device will be more clearly understood by reference to the accompanying drawings and the detailed description which follows. While the specification, for the purpose of illustration, refers to paper liners and to their insertion in the zinc cans of conventional dry cells, any other flexible material in sheet form could be formed into a cylinder by this apparatus and such cylinder could be inserted in a can or tube or not, depending on the manner in which the cylinder is to be used.

In the drawings:

Fig. 1 is a plan view of the apparatus;

Fig. 2 is a similar view, on an enlarged scale of the portion of the apparatus to the left in Fig. 1;

Fig. 5 is a vertical, longitudinal, sectional view of a portion of the apparatus;

Fig. 6 is a similar view of another portion of the apparatus;

Fig. 7 is a view similar to Fig. 6 showing the parts in a different position;

Fig. 9 is a vertical, sectional view on line 9—9 of Fig. 3;

Fig. 10 is a similar view on line 10—10 of Fig. 2;

Figure 3:
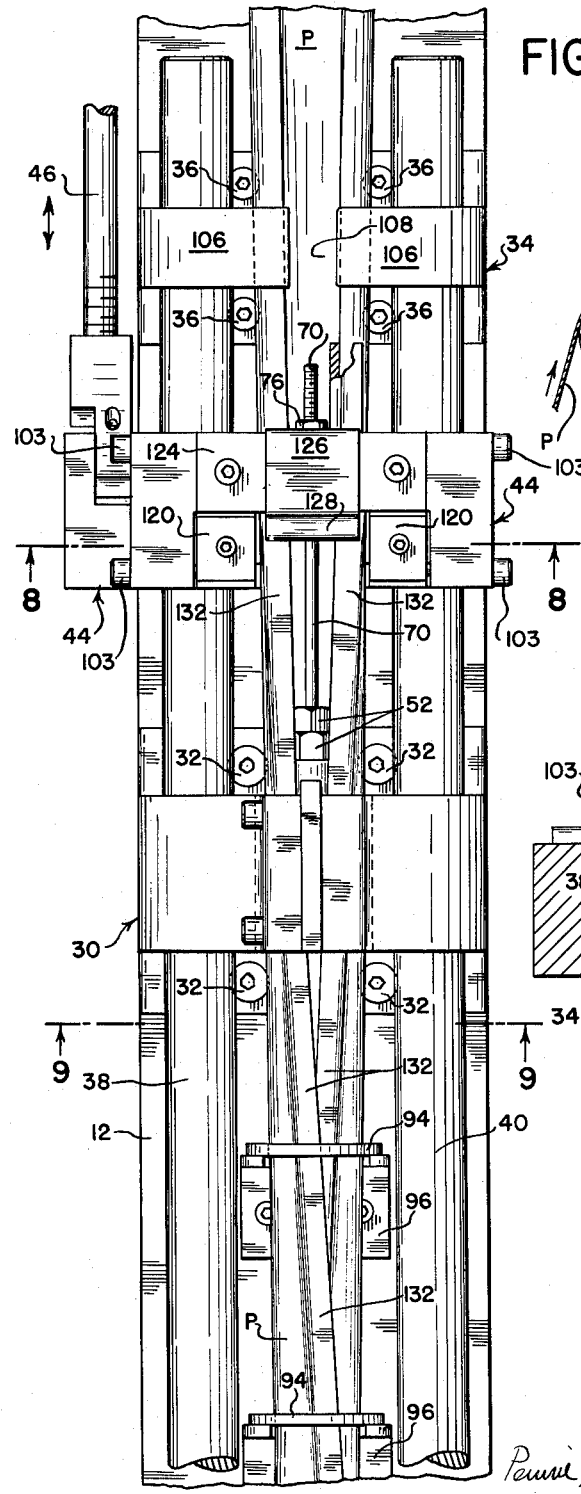
Fig. 3 is a similar view of the central portion of Fig. 1.

In the illustrated embodiment of the invention in which the apparatus is used to form liners and insert them into dry cell cans, the apparatus may form part of a machine for making dry cells of the type disclosed and claimed in the co-pending application referred to. Thus, the cans C may be supported on an intermittently driven belt 2, to which the cans are fed by suitable means (not shown) to the left in Figs. 1 and 2 of the drawings, and from which they are removed at one end of the machine (not shown) to the right in these figures. The cans are held in saddles by rollers 4 and 5. These rollers are mounted on pivoted arms 6 (see Fig. 7) pivoted on a plate 8 forming a part of the frame of the machine. They are normally held in lowered position to engage the can by a spring 10, secured to the arm and to plate 8.

Figure 12:
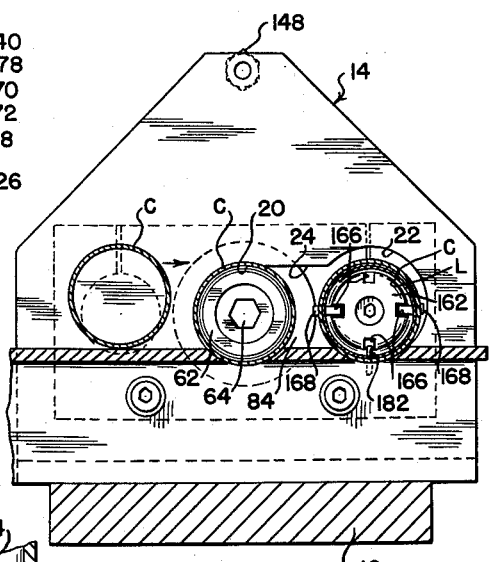
Fig. 12 is a similar view on line 12—12 of Fig. 2.

The apparatus is mounted on a bed or table 12. At the side of the table adjacent the belt, a member 14 is secured to the table by bolts 16 received in openings in flange 18, and in tapped openings in the bed. The member 14 (see Fig. 12) is provided with a central opening 20 and an opening 22 connected by a slot 24, as shown. At a distance from the supporting member 14, a supporting member 26 is likewise bolted to the bed of the machine by bolts 28. A supporting member 30 (see Figs. 5 and 9) is also bolted to the bed by bolts 32 and spaced from supporting member 26. Rearwardly of the supporting member 30, a supporting member 34 is bolted to the frame by bolts 36.

Figure 8:
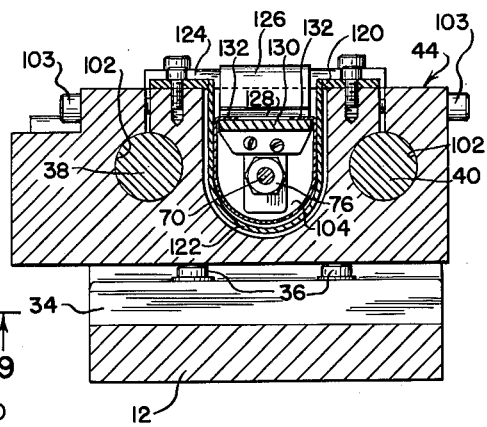
Fig. 8 is a vertical, transverse, sectional view on line 8—8 of Fig. 3.

Movable parts of the mechanism include a pair of rods 38 and 40, one of which is arranged on each side of a sleeve or tube 42. Rods 38 and 40 are connected to a cross-head 44 (see Figs. 1, 3 and 8). The cross-head is reciprocated by a link 46 (see Fig. 3) driven by a suitable cam 49. Sleeve 42 is floatingly supported by supporting member 30 forwardly of the cross-head 44. As shown (see Fig. 5) a ferrule 48 is welded, or otherwise secured, to the end of tube 42. The ferrule passes through an opening 50 in the support, and is threaded on its outer end. Nuts 52 lock the assembly in position. The nuts permit adjustment of the tube in an axial direction, and in the operation of the mechanism it is essential that the tube be held against axial movement. The opening 50 may be tapered longitudinally to permit slight movement of tube 42 in any direction, other than axial. The tube, as shown, extends forwardly and terminates adjacent the member 14 (see Figs. 5 and 6). It is supported intermediate its ends in a frame 54 carried by supporting member 26. A coil spring 56 is mounted over a pin 58. This spring bears against a plate 59 which is a part of frame 54, and which in turn engages the under side of tube 42 and supports it.

One of the die members, which severs the cylinders of material, is carried in the end of tube 42. Plug 60 (see Fig. 6) is arranged in the tube near its end and has a central, threaded opening into which die 62 is received. The die is held in position by a locking bolt 64. The end 66 of the die which forms one of the cutting members is of greater diameter than the body portion, as shown. In actual practice, its diameter must exceed that of the body portion by more than four times the thickness of the paper or other sheet material of which the cylinder is formed. It projects furthest beyond the end of the tube and is of greater diameter than the tube.

Figure 11:
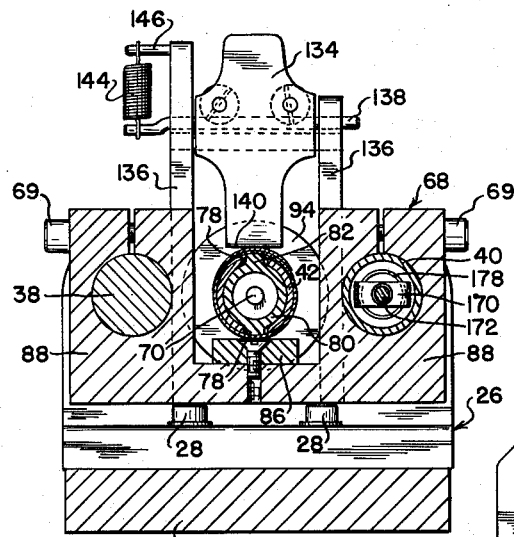
Fig. 11 is a similar view on line 11—11 of Fig. 2.

The other member of the die is carried by a frame 68 which is positioned between supporting members 14 and 26. It is reciprocated from the position shown in Fig. 6 to the position shown in Fig. 7 and back on each cycle of operation. As shown (see Fig. 11) the frame is provided with openings to receive rods 38 and 40 and bolts 69 are provided to fasten the frame to the rods to cause it to move with them. The frame also has a central open area through which tube 42 passes. A rod 70 (see Figs. 5 and 6) passes through an opening 72 in a depending portion of cross-head 44. The opening is in alignment with the axis of tube 42. A bushing 74 is arranged in the opening and the bushing extends slightly beyond the ends of the openings. Nuts 76 are arranged on the threaded end of rod 70 engaging the ends of the bushing to accurately control positioning of the rod axially. This bushing may also be provided with a bore whose diameter increases slightly from the center to each end to permit the rod to adjust itself in all directions, except axially. As shown (see Figs. 7 and 11), the tube 42 adjacent its forward end is provided with slots 78 at the top and bottom. A pair of ribs 82 rides in these slots. These ribs are arranged diametrically opposite each other on a cylindrical member 80, arranged within the tube 42 and secured to the end of rod 70 in any suitable manner, as by welding. Rod 70 is floating at this end, but its movement is limited by cylindrical member 80. Member 82 is slightly smaller than the bore of the tube to permit limited movement of the end of the rod. The die 84 carried by frame 68 is cylindrical and has a central opening of a diameter to snugly receive tube 42 and the cylinder of paper thereon. Beneath the cylinder, frame 68 carries a bearing block 86 which is secured to the frame by bolts (see Figs. 6 and 11).

Supporting member 26 (see Fig. 10) is provided with openings 90 at each side for passage of rods 38 and 40. As shown, it has a relatively large central opening 92 in which the tube 42 is received. The member 26 also carries means for holding the paper against movement to be hereinafter described.

Between the supporting member 26 and the supporting member 30, I provide a series of floating rings 94 through which tube 42 passes. The rings are held against brackets 96 and have openings of proper size to guide the paper and form it into a cylinder surrounding the tube. The supporting member 30 (see Fig. 9) absorbs the thrust when the die members come together and cut the paper and is, therefore, larger. It has openings 98 at each side to receive rods 38 and 40, and a central opening 100 through which tube 42 passes. The central opening may be considerably larger than the diameter of tube 42 (see Fig. 5). Cross-head 44 (see Fig. 8) has openings 102 at each side wherein rods 38 and 40 are fastened and a central open portion 104 through which the paper is fed to the tube 42. The rods are secured to the cross-head by tightening bolts 103. Thus, reciprocation of cross-head 44 causes the frame 68 and rod 70 to be reciprocated. The rear supporting member 34 consists of a pair of blocks 106 bolted to the frame and having a space 108 between them for the passage of the paper. Blocks 106 have openings through which rods 38 and 40 pass.

Figure 4:
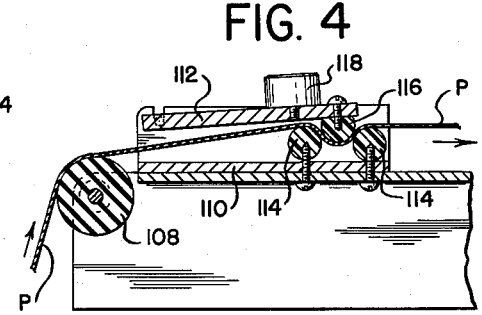
Fig. 4 is a vertical, sectional view on line 4—4 of Fig. 1.

The paper P, in sheet form, is fed from a suitable source over a roller 108 at the back or side of the machine opposite to the side where the endless belt is positioned (see Figs. 1 and 4). It passes through a tensioning device and thence to the mechanism for forming it into a cylinder. The tensioning device includes a base member 110 and a weighted member 112 hinged over the base. Base member 110 carries a pair of guides 114 and hinged member 112 carries a similar guide 116. The guides are arranged so that the paper follows a serpentine path between them. By adjusting the weight 118 carried by the hinged member any desired drag can be placed on the paper. The sheet is slightly wider than the inner circumference of can C, thus permitting it to be formed into a cylinder that fits in the can with some overlap. As shown in Fig. 1, the paper forms into a U as it passes between the blocks 106 of the rear supporting member. As it passes through cross-head 44, it is creased adjacent and parallel to each edge. In the cross-head (see Figs. 5 and 8) I provide a plate 120 having a U-shaped portion 122 which is replaceable by similar plates of other sizes for forming liners for cells of different sizes. A plate 124 extends across the top of the cross-head over the open portion 104.

A spring clip 126 is secured to this plate. This clip comprises a portion 128 (see Fig. 5) which extends down into opening 104. It cooperates with a plate 130 to crease the paper adjacent each edge which facilitates forming the paper into a cylinder on tube 42. As shown, the paper passes between the depending portion 128 of the clip and plate 130, forming a crease along the sheet at each side with the portion 132 of the paper between the crease and the edge folded over substantially at right angles to the adjacent portion. The partially formed paper cylinder remains open at the top as it passes through supporting member 30 on which tube 42 is mounted (see Fig. 3). It then passes through rings 94 and is formed into a cylinder with overlapping edges.

The paper is fed by means mounted on frame 68. As shown, a gripping device 134 (see Figs. 6, 7 and 11) is pivoted on the frame. A pair of arms 136 extend upwardly from frame 68 and these arms have openings to receive pin 138 carried by the gripping device. The lower edge 140 of the gripping device engages the top exterior layer of the paper. Spring 144, arranged between an offset extension of one end of the pivot pin 138 and a pin 146 carried by one of the arms 136, urges the gripping device in a clockwise direction. As the tube 42 is floating at this end, the paper is clamped between gripping member 134 and rib 82 at the top of the tube and plate 86 and rib 82 at the bottom and is somewhat loosely wrapped on the tube. When frame 68 and rod 70 are reciprocated forwardly, the paper moves with them. The portion of the paper cylinder in front of the frame is moved into the can (see Fig. 7). The diameter of the male die member 66 and the diameter of the opening in female die member 84 is such that when they come together at the end of the forward movement of frame 68, there is no room for the paper, and the portion of the cylinder ahead of them is severed.

The paper feed must be released prior to the severing operation. If the paper were still being fed at the time of severing, there would be a tendency to crumple it. The release is accomplished by a stop member 148 which engages gripping device 134 and moves it counter-clockwise against the tension of spring 144. Stop member 148 is mounted in the supporting member 14 and is preferably a threaded rod to permit its adjustment. As frame 68 moves rearwardly, gripping member 134 slides over the paper and does not cause movement of it. The paper is held against rearward movement by a second gripping device 150, mounted on supporting member 26. As shown (see Fig. 10) arms 152 have openings to receive pivot pin 154. A spring 156 is connected to an offset end of this pin and to a pin 158 on one of the arms 152. Thus, gripping device 150 clamps the paper at the top on cylinder 42, and spring 56 forces plate 59 against the paper on the bottom of the tube. When the paper is pulled forwardly by frame 68, the gripping device yields and permits it to move but any rearward movement would bring the gripping device into closer engagement with the paper and tube and is thus impossible.

As shown in Fig. 7, when the liner is severed, its end is not at the bottom of the can. The liner is cut from the cylinder on one side of supporting member 14 with the can on the other side of this member. The movement of frame 68 is generally equal to the height of the can, but it will be apparent in Fig. 7 that as the liner is severed a distance from the top edge of the can, it is not generally at the bottom of the can when severed.

Figure 13:
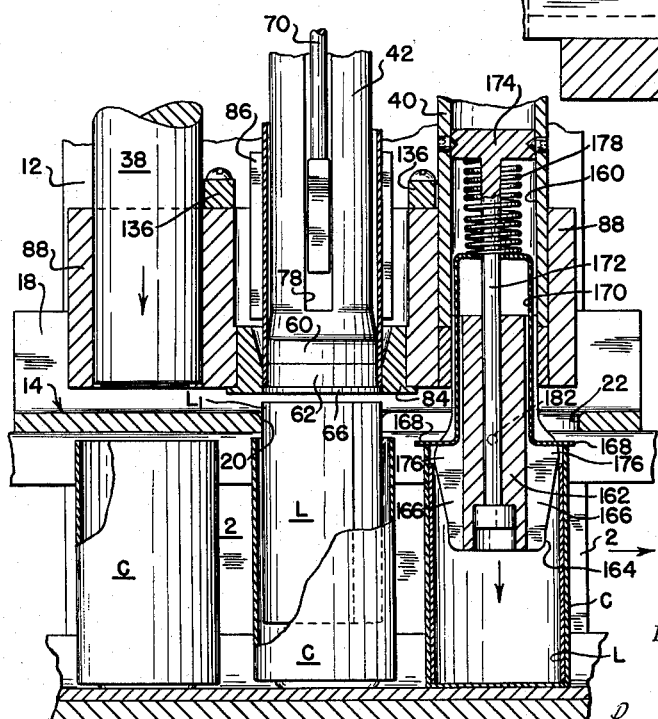
Fig. 13 is a horizontal, sectional view on line 13—13 of Fig. 7.

At the station where the can is aligned with rod 40, I provide means for completing the movement of the liner into the can, and opening it to cause the liner to come into full contact with the wall of the can. As the can is moved from the middle position in Figs. 12 and 13 of the drawing to the position at the right, the projecting portion $L_1$ of the liner passes through slot 24 in supporting member 14. The end of rod 40 is bored, as at 160. A spreader 162 is mounted in the bore and projects beyond the end of the rod 40. It thus enters the can, as shown in Fig. 13 when the parts are in the forward position. The end 164 of the spreader is smaller than the diameter of the liner cylinder facilitating its entrance into the liner in the can. The spreader is provided with a plurality of slots 166 adjacent its end. Two or more of these slots receive the ends 168 of a member 170 which is also mounted in bore 160. The ends 168, as shown, extend outwardly beyond the can. They engage the edge of the projecting portion of the liner and move it into the can. Spreader 162 is mounted on a rod or pin 172. The end of this pin is secured to a disc 174. Disc 174 is mounted in the bore 160 at a proper position to permit spreader 162 to enter the can to a point where the portion 176 of largest diameter is past the mouth of the can. This opens the liner into contact with the can wall and also moves it into the can. A spring 178 surrounds the rod 172 and contacts with disc 174 and the bottom of member 170. As the fingers 168 move the liner into the can and come in contact with the edge of the can, member 170 is moved into the bore 160 placing spring 178 under tension. As the rod 40 begins its rearward movement, the spring moves member 170 and fingers 168 forward to their normal position (see Fig. 2).

At this station the wider portion 176 of the spreader may sometimes fit so snugly inside the lined can that the can or liner might have a tendency to move with the spreader when the operating mechanism is retracting. One means of retaining the can in its position is the roller 5 (see Fig. 2). At stations where there is no tendency of the can to move laterally, the flat surfaced roller 4 may be employed. The shape of roller 5 provides a sharp edge 180 which digs into the can enough to prevent this lateral movement. Another means for preventing lateral movement of the can at this point may be a projecting pin 182 (see Fig. 12) carried by supporting member 14. Pin 182 does not interfere with the movement of the spreader as it is in alignment with and rides in lower slot 166 when the spreader moves into the mouth of the can. However, if the can or liner should have a tendency to move with the spreader as it is withdrawn from the can, the edge of the can or liner comes into contact with pin 182 and further movement of the can or liner is prevented.

I claim:

1. Means for forming a liner for a dry cell comprising a stationary tube, means to position a can in axial alignment with the tube, means for delivering paper in sheet form to the tube and forming it into a cylinder on the tube, a die member mounted at the end of the tube, a reciprocating frame mounted on the tube, a second die member carried by the frame and surrounding the tube, and means carried by the frame to feed the cylinder of paper along the tube and into the can, the second die member surrounding the first die member when the frame is reciprocated to sever the portion of the paper cylinder forwardly of the tube from the portion on the tube.

2. Apparatus for forming cylinders of sheet material of a desired length, comprising a stationary tube to receive the material and retain it in cylindrical form, a die member carried at one end of the tube having a cutting element of slightly greater diameter than the diameter of the tube, a reciprocating frame on the tube, a die member carried by the frame, the second die member surrounding the tube and cooperating with the first mentioned die member to sever a cylinder in advance of the end of the tube when the frame is reciprocated and the die members are brought together, means to intermittently reciprocate the frame, and means carried by the frame to feed the cylinder along the tube.

3. Apparatus for forming cylinders from flexible sheet material comprising a stationary tube, a forming member of substantially U-shaped cross-section in alignment with the tube, a source of sheet material, the sheet material being fed through said forming member to the exterior of the tube, a reciprocating frame surrounding the tube, means for intermittently reciprocating the frame, means carried by the frame to feed the formed cylinder along the tube, and cooperating die members carried by the frame and the tube, the die member on the frame surrounding the die member on the tube whereby the portion of the cylinder forwardly of the die members is severed when the frame is reciprocated forwardly.

4. Apparatus in accordance with claim 2 in which the feeding means comprises a pivoted member engaging the cylinder on the tube.

5. Apparatus in accordance with claim 4 in which means are arranged in the path of the pivoted member to engage the pivoted member and release the cylinder.

6. Apparatus in accordance with claim 4 in which a second pivoted member is mounted on a support through which the tube passes and engages the cylinder of material to prevent it from moving in a reverse direction.

7. Apparatus in accordance with claim 1 in which the end of the cylinder is fed partially into a can before it is severed, and means are provided to move the cylinder into the can to serve as a liner.

8. Means for forming a liner for a dry cell comprising a stationary tube, means to position a can in axial alignment with the tube, a frame mounted to reciprocate on the tube, means carried by the frame to engage the sheet material which has been formed into a cylinder on the tube and intermittently feed it along the tube and into the can, and cooperating die members arranged adjacent the end of the tube and carried by the frame, the die member carried by the frame surrounding the die member carried by the tube when the frame is reciprocated in one direction to sever the portion of the sheet material beyond the tube from the portion on the tube.

9. Apparatus for forming a liner for a dry cell from flexible sheet material comprising a stationary tube, means to position a can in axial alignment with one end of the tube, a forming member of substantially U-shaped cross-section in alignment with the other end of the tube, a reciprocating frame surrounding the tube, means carried by the frame to engage a cylinder on the tube when the frame is moving toward the first mentioned end of the tube and feed it intermittently along the tube, a die member mounted on the tube adjacent said end, and a second die member carried by the frame and surrounding said first mentioned die when the frame is reciprocated toward said end of the tube to sever the portion of the cylinder that is positioned forwardly thereof.

10. Apparatus for forming liners and for inserting said liners into dry cell cans comprising an elongated stationary tube, feeder means operative to advance successive cans into a loading position in axial alignment with said tube adjacent one end thereof, means adjacent the other end of said tube for supplying a continuous length of liner material of a prescribed width to said tube, a first feeding member disposed within said tube, means operatively connected and mounting said first feeding member for axial reciprocation within said tube, a second feeding member external to said tube and adjacent said first feeding member, means operatively connected to and mounting said second feeding member for axial reciprocation external to said tube, forming means along said tube for forming said length of linear material into tubular configuration, said first and second feeding members engaging said formed length and being effective in response to reciprocation to feed said formed length into a can at said loading position, actuating means for reciprocating said first and second feeding members, a first die member mounted at said one end of said tube and having an annular cutting element of greater diameter than the outer diameter of said tube over which said formed length normally passed during feed into said can, and a second die member operatively connected to and movable with said second feeding member and having an annular cutting element, coaxially with said tube and engaging said annular cutting element of said first die member after reciprocation through a prescribed axial stroke by said actuating means, said annular cutting element of said second die member having a diameter substantially equal to said diameter of the annular cutting element of said first die member to sever said formed length after feed of a portion thereof into said can.

11. Apparatus according to claim 10 including means pivotally mounting said second feeding member for movement toward and away from said first feeding member, and spring means operatively connected to said second feeding member for biasing the same toward said first feeding member, said second feeding member being inclined relative to said tube such as to be effective for feed of said formed length only during forward reciprocation of said feeding members toward said one end of said tube.

12. Apparatus according to claim 10 including clamping means engaging said formed length and effective to hold said formed length against rearward movement relative to said tube incident to rearward reciprocation of said feeding members.

13. Apparatus for forming liners and for inserting said liners into dry cell cans comprising an elongated stationary tube, feeder means operative to advance successive cans into a loading position in axial alignment with said tube adjacent one end thereof, means adjacent the other end of said tube for supplying a continuous length of liner material of a prescribed width to said tube, a first feeding member disposed within said tube, means operatively connected to and mounting said first feeding member for axial reciprocation within said tube, a second feeding member external to said tube and adjacent said first feeding member, means operatively connected to and mounting said second feeding member for axial reciprocation external to said tube, forming means along said tube for forming said length of liner material into tubular configuration, said first and second feeding members engaging said formed length and being effective in response to reciprocation to feed said formed length into a can at said loading position, actuating means for reciprocating said first and second feeding members, a first die member mounted at said one end of said tube over which said formed length normally passed during feed into said can, and a second die member coaxial with said tube and operatively connected to and movable with said second feeding member and engaging said first die member after reciprocation through a prescribed axial stroke by said actuating means to sever said formed length after feed of a portion thereof into said can.

14. Apparatus for forming liners and for inserting said liners into dry cell cans comprising an elongated stationary tube, feeder means operative to advance successive cans into a loading position in axial alignment with said tube adjacent one end thereof, means adjacent the other end of said tube for supplying a continuous length of liner material of a prescribed width to said tube, a first feeding member disposed within said tube, means operatively connected to and mounting said first feeding member for axial reciprocation within said tube, a second feeding member external to said tube and adjacent said first feeding member, means operatively connected to and mounting said second feeding member for axial reciprocation external to said tube, forming means along said tube for forming said length of liner material into tubular configuration, said first and second feeding members engaging said formed length and being effective in response to reciprocation to feed said formed length into a can at said loading position, actuating means for reciprocating said first and second feeding members, a first die member mounted at said one end of said tube over which said formed length normally passed during feed into said can, a second die member coaxial with said tube and operatively connected to and movable with said second feeding member and engaging said first die member after reciprocation through a prescribed axial stroke by said actuating member to sever said formed length after feed of a portion thereof into said can, and means operable after forward reciprocation of said second feeding member and said second die member through a portion of said prescribed axial stroke to disengage said second feeding member from said formed length to disrupt forward feed thereof in advance of engagement between said first and second die members.

15. Apparatus for forming liners and for inserting said liners into dry cell cans comprising an elongated stationary tube, feeder means operative to advance successive cans into a loading position in axial alignment with said tube adjacent one end thereof, means adjacent the other end of said tube for supplying a continuous length of liner material of a prescribed width to said tube, a first feeding member disposed within said tube, means operatively connected and mounting said first feeding member for axial reciprocation within said tube, a second feeding member external to said tube and adjacent said first feeding member, means operatively connected to and mounting said second feeding member for axial reciprocation external to said tube, forming means along said tube for forming said length of liner material into tubular configuration, said first and second feeding members engaging said formed length and being effective in response to reciprocation to feed said formed length into a can at said loading position, actuating means for reciprocating said first and second feeding members, a first die member mounted at said one end of said tube and having a cutting element of greater diameter than the outer diameter of said tube over which said formed length normally passed during feed into said can, a second die member coaxial with said tube and operatively connected to and movable with said second feeding member and engaging said first die member after reciprocation through a prescribed axial stroke by said actuating means to sever said formed length after feed of a portion thereof into said can, and means operable to advance the severed portion of said formed length into a seated position in said can.

16. Apparatus according to claim 15 including means effective during said advance of said severed portion to spread said severed portion.

17. Apparatus for forming liners and for inserting said liners into dry cell cans comprising an elongated stationary tube, feeder means operative to advance successive cans into a loading position in axial alignment with said tube adjacent one end thereof, means adjacent the other end of said tube for supplying a continuous length of liner material of a prescribed width to said tube, first and second feeding members, means operatively connected to and mounting said feeding members for axial reciprocation relative to said tube, forming means along said tube for forming said length of liner material into tubular configuration, said feeding members engaging said formed length and being effective in response to reciprocation to feed said formed length into a can at said loading position, actuating means for reciprocating said feeding members, a first die member mounted at said one end of said tube and having a cutting element of greater diameter than the outer diameter of said tube over which said formed length normally passed during feed into said can, and a second die member coaxial with said tube and operatively connected to and movable with said second feeding member and engaging said first die member after reciprocation through a prescribed axial stroke by said actuating means to sever said formed length after feed of a portion thereof into said can.

18. Apparatus according to claim 17 including means operable after forward reciprocation of said second feeding member and said second die member through a portion of said prescribed axial stroke to disengage said second feeding member from said formed length to disrupt forward feed thereof in advance of engagement between said first and second die members.

References Cited in the file of this patent

UNITED STATES PATENTS

| | | |
|---|---|---|
| 2,428,098 | Schmidt | Sept. 30, 1947 |
| 2,521,007 | Heinmets | Sept. 5, 1950 |